(12) United States Patent
Yang et al.

(10) Patent No.: US 8,630,223 B2
(45) Date of Patent: Jan. 14, 2014

(54) EFFICIENT FRAME STRUCTURE FOR DIGITAL SATELLITE COMMUNICATION

(75) Inventors: Ming Yang, Beijing (CN); Fengwen Sun, Germantown, MD (US); Fangyi She, Beijing (CN); Yimin Jiang, Vienna, VA (US); Guofang Sheng, Beijing (CN); Zhenliang Shi, Germantown, MD (US); Yingjiu Xu, Rockville, MD (US)

(73) Assignee: Availink, Inc., Germantown, MD (US)

( * ) Notice: Subject to any disclaimer, the term of this patent is extended or adjusted under 35 U.S.C. 154(b) by 699 days.

(21) Appl. No.: 12/712,079

(22) Filed: Feb. 24, 2010
(Under 37 CFR 1.47)

(65) Prior Publication Data

US 2011/0096718 A1      Apr. 28, 2011

Related U.S. Application Data

(63) Continuation of application No. 11/813,205, filed as application No. PCT/CN2006/002427 on Sep. 18, 2006, now abandoned.

(51) Int. Cl.
*H04W 40/00* (2009.01)
*H04J 3/24* (2006.01)

(52) U.S. Cl.
USPC .................................................. 370/316

(58) Field of Classification Search
None
See application file for complete search history.

(56) References Cited

U.S. PATENT DOCUMENTS

| | | | |
|---|---|---|---|
| 5,872,775 A | 2/1999 | Saints et al. | |
| 6,263,466 B1 * | 7/2001 | Hinedi et al. | 714/755 |
| 6,643,281 B1 * | 11/2003 | Ryan | 370/350 |
| 6,956,814 B1 | 10/2005 | Campanella | |
| 7,336,683 B1 * | 2/2008 | Eidson et al. | 370/479 |
| 2004/0213229 A1 * | 10/2004 | Chang et al. | 370/390 |
| 2004/0252229 A1 * | 12/2004 | Jiang et al. | 348/385.1 |
| 2005/0058229 A1 | 3/2005 | Alagha | |
| 2005/0066262 A1 | 3/2005 | Eroz et al. | |
| 2005/0089068 A1 | 4/2005 | Sun et al. | |
| 2005/0123073 A1 | 6/2005 | Ginesi et al. | |
| 2007/0254693 A1 * | 11/2007 | Furukawa | 455/553.1 |

OTHER PUBLICATIONS

Chen, J. et al., Near Optimum Universal Belief Propagation Based Decoding of Low-Density Parity Check Codes, IEEE Transactions on Communications, 50(3):406-414 (Mar. 2002).

Karam, G. et al., A variable-rate QPSK demodulator for digital satellite TV reception, IBC 94. International Broadcasting Convention (Conf. Publ. No. 397) IEEE, London, UK 1994, 646-50 (Abstract).

Morello, A. et al., DVB-S2, the second generation standard for satellite broadcasting and unicasting, International Journal of Satellite Communications and Networking, 22:249-68. Wiley, UK (May-Jun. 2004).

Ohkawa, M. et al., COMETS 21-GHz Advanced Satellite Broadcasting Experiments—Evaluation of Trellis-Coded 8-PSK Performance, IEEE Transactions of Broadcasting, 46(2):144-151 (Jun. 2000).

(Continued)

*Primary Examiner* — Jason Mattis
*Assistant Examiner* — Teisha D Hall
(74) *Attorney, Agent, or Firm* — Greenblum & Bernstein, P.L.C.

(57) ABSTRACT

A digital communications system and method to transmit and receive a digital communications signal wherein the digital signal has a plurality of frames, wherein at least two modulations are supported, and wherein each of the plurality of frames has the same number of symbols.

11 Claims, 4 Drawing Sheets

(56) References Cited

OTHER PUBLICATIONS

Saito, T. et al., Transmission Systemfor Satellite ISDB, Global Telecommunications Conference 1998. GLOBECOM 98. The Bridge to Global Integration. IEEE, 5:2942-2947 (Nov. 1998).

Vasquez Castro, M.A. et al., Encapsulation and Framing Efficiency of DVB-S2 Satellite Systems, Vehicular Technology Conference, 2004. IEEE. 59:2896-2900 (May 2004).

International Search Report and Written Opinion, mailed May 31, 2007, cited in related Int'l Application No. PCT/CN2006/002427, filed Sep. 18, 2006.

* cited by examiner

| Codeword_count_in_next_fram | Reserved | i = 0 | | | | | ...... | i = codeword_count_in_next_frame | | | | |
|---|---|---|---|---|---|---|---|---|---|---|---|---|
| | | Status | Mod | Code rate | Pad | Resv | | Status | Mod | Code rate | Pad | Resv |
| 4 bits | 4 bits | 1 bit | 2 bits | 4 bits | 16 bits | 1 bit | | 1 bit | 2 bits | 4 bits | 16 bits | 1 bit |
| 1 byte | | 3 bytes | | | | | | 3 bytes | | | | |

EFFICIENT FRAME STRUCTURE FOR DIGITAL SATELLITE COMMUNICATION

RELATED APPLICATIONS

This application is a continuation of U.S. patent application Ser. No. 11/813,205, filed Jun. 29, 2007, which is the U.S. National Stage of International Application No. PCT/CN2006/002427, filed Sep. 18, 2006 and claims the benefit thereof. This application relates to application Ser. No. 11/813,204, filed Jun. 29, 2007.

FIELD OF THE INVENTION

The present invention relates to digital satellite communication and in particular to frame designs for transmitted signals to increase transmission efficiency and FEC performance and to simplify satellite receiver implementation such as synchronization control and FEC decoding.

BACKGROUND OF THE INVENTION

In modern digital communication systems such as digital satellite systems, a goal is to transport digital data bits representing user information such as video, audio and other data types from a source (or a transmitter) to a destination (or a receiver or even multiple receivers) with a pre-defined maximum transportation error rate or bit error rate (BER). To control the transportation errors, typical transmitters usually add redundant bits into an original data bit stream for transmission. The process of adding redundant bits is called forward error control (FEC) encoding. In an encoded bit stream, it is possible for a receiver to recover original information with an eror rate less than the defined error rate by running an FEC decoding algorithm, even if the transmitted bits are contaminated by extraneous signals (e.g., noise and/or interference) and distorted by non-ideal channel characteristics. For some applications, such as voice communication, a maximum BER of $10^{-2}$ is acceptable. For other applications, such as file transfer and most internet traffic, a zero BER is required. When a zero BER is required, data is often re-transmitted if a receiver detects any un-correctable errors. For application such as video conferencing and broadcasting, a BER of less than $10^{-9}$ is preferred to provide a smooth display of a video signal on video monitors. Such a BER, is often referred to as a Quasi-Error-Free (QEF) condition.

Even if a QEF is achieved using LDPC codewords, such an encoded signal format is not acceptable for transmission, because receivers can't decode received signals without knowing where each encoded portion (such as an LDPC codeword) starts or ends. Time references (or markers) have been necessary throughout the transmission to help identify the positions of such codewords. Similarly, typical communication systems require that receivers' time and frequency be locked to a transmitter's reference, which is referred to as synchronization.

Furthermore, certain overhead information is typically periodically transferred to enable receivers to properly demodulate transmitted signals, decode signals and abstract user messages. For at least these reasons, typical transmitters insert a synchronization pattern and a header periodically into encoded messages, a process called frame formatting. Typically, a receiver first tries to lock onto a synchronization pattern and then decodes the header and message signal. Frame formatting design is critical to overall system performance and can directly impact the cost of establishing and operating a communication system. Frame formatting design often depends on many factors, such as channel characteristics, modulation type and FEC scheme. A well designed frame format may result in high performance receivers that achieve fast frame acquisition, reliable tracking (time and frequency lock) and improved FEC decoding performance (such as meeting the required BER) with minimum overhead at a low cost.

BRIEF SUMMARY OF THE INVENTION

According to various embodiments of the invention, a unique approach to frame satellite transmission messages to achieve excellent communication performance with simple receiver implementation is presented. Typically in satellite communication, messages in bits are grouped into many consecutive signal blocks called frames after the encoding. Each frame typically includes a frame header and a synchronization waveform to allow receivers to synchronize with incoming signal frames, process the headers, and decode the messages if indicated by the header information. In the existing systems such as DVB-S and DVB-S2, a frame typically carries a fixed number of information bits, which are in turn encoded into one codeword. This is acceptable if the systems only employ modulations with a fixed dimension, e.g. QPSK and pi/4QPSK with dimension 2 in which 2 bits are conveyed by one modulating symbol. However, for modern digital satellite applications, modulations with different dimensions are likely to be used in a single system to take advantage of the powerful error correction capability of LDPC code and other advanced FEC technologies, and to dynamically adapt the system's modulation and FEC for time varying channels. In such cases, even if the number of bits in a frame is fixed, when the frame length is measured by the number of symbols the frame length will be different for different modulation dimensions. On the implementation side, this difference in symbol length creates a difficulty for tracking the synchronization waveforms which do not appear at a regular time interval (longer interval for smaller modulation dimension). On the performance side, the synchronization performance is not consistent for all modulation dimensions and is degraded more for smaller dimension.

Accordingly, various embodiments of the invention eliminate the above mentioned problems by ensuring that the number of symbols in a frame remains constant. According to various embodiments of the invention, frame formats are designed to allow multiple LDPC (or other EEC) codewords in a single frame for a highly efficient transmission. In these embodiments, each codeword may have a different modulation dimension and/or code rate. According to various embodiments of the invention, a synchronization waveform, called unique word (UW), is followed by an auxiliary control code (ACC) and a frame header. The UW, ACC and frame header are attached to the beginning of each frame. According to these embodiments of the invention, the receiver knows where to look for the UW, ACC and the header, making sync control extremely simple.

According to various embodiments of the invention, the sync performance is also ensured due to the evenly distributed UWs. The UW is carefully designed to yield sufficient synchronization performance under the most adverse satellite channel conditions such as transponder distortion, poor receiver LNA (low noise amplifier), large frequency and/or timing errors, etc. According to various embodiments of the invention, the ACC may employ a simple orthogonal tone code that carries information on modulation and/or code rate.

The frame header may be designed to carry sufficient information for decoding multiple code words while keeping a minimal overhead.

According to various embodiments of the invention, pilot waveforms are inserted uniformly during a frame to further enhance the synchronization performance. Furthermore, the size of each pilot segment may be adjustable according to channel condition, thus reducing overhead when channel conditions and modulation and code rate allow for a smaller or zero pilot. To avoid uneven spectrum distribution, the frames are scrambled by a random sequence which may be a member of the gold sequence set.

According to various embodiments of the invention, a frame format of a digital satellite transmission, may have: a plurality of frames, each frame having a fixed number of modulated symbols, regardless of a modulation type of the system, and each frame beginning with a unique word; wherein a spacing, in number of symbols, between any two consecutive unique words is identical, regardless of modulation type in the system.

According to various embodiments of the invention, a digital satellite transmission system transmits a periodic unique word, comprising: a transmitter to transmit the periodic unique word, the periodic unique word comprising a 64-symbol QPSK modulated waveform with baseband I and Q bits defined as $UW_I$=0x40F0B6EC088E3A21,
$UW_Q$=0xEB498CA3B538F49D.

According to various embodiments of the invention, a digital storage media may store a unique word, comprising: a memory to store the unique word, the unique word comprising baseband I and Q bits defined as $UW_I$=0x40F0B6EC088E3A21,
$UW_Q$=0xEB498CA3B538F49D.

According to various embodiments of the invention, a plurality of evenly distributed pilot segments are inserted into each frame, the pilot segments being identical for all frames in terms of locations and waveforms, regardless of a modulation type employed.

According to various embodiments of the invention, a length of the pilot segments is adjustable.

According to various embodiments of the invention, the number of symbols per frame, excluding the unique word, an auxiliary control code and the pilot segments, perfectly accommodates a different number of codewords for each different modulation.

According to various embodiments of the invention, multiple codewords in each frame share one frame header.

According to various embodiments of the invention, network operation information and/or other private information may be transmitted through a plurality of Network Bytes in a header of each frame.

According to various embodiments of the invention, a digital satellite receiver system may process a received signal, comprising: a receiver to receive the signal; and a processor to process the signal, wherein the signal comprises a frame format that contains a fixed number of modulated symbols per frame and a unique word at a beginning of each frame.

According to various embodiments of the invention, a digital satellite receiver system, may comprise: a receiver to receive a signal, wherein the receiver achieves synchronization to the signal based on a unique word that is QPSK modulated with I and Q defined as $UW_I$=0x40F0B6EC088E3A21,
$UW_Q$=0xEB498CA3B538F49D.

According to various embodiments of the invention, said receiver can process an inserted pilot segment of a given length if in a pilot operation mode.

According to various embodiments of the invention, said receiver can decode a plurality of FEC codewords in a single frame, regardless of modulation employed.

According to various embodiments of the invention, said receiver can decode all the codewords in a frame based on only a header embedded in the first codeword of the frame, regardless of number of codewords in the frame.

According to various embodiments of the invention, said receiver can decode network operation information and/or other private information located immediately following a header field in each frame for any modulation.

According to various embodiments of the invention, a digital communications system may have: a transmitter to transmit a digital signal; and a receiver to receive the digital signal; wherein the digital signal comprises a plurality of frames, each frame comprising at least one codeword, wherein said system supports at least two different modulations, and wherein each of the plurality of frames has the same number of symbols.

According to various embodiments of the invention, the plurality of frames have the same fixed physical time for a given transmission rate or symbol rate.

According to various embodiments of the invention, codewords in the same frame may have a different modulations for Adaptive Coding and Modulation (ACM) mode.

According to various embodiments of the invention, each of the plurality of frames further comprises a Unique Word at a predetermined position.

According to various embodiments of the invention, the predetermined position is at the beginning of the frame.

According to various embodiments of the invention, a first codeword in each frame comprises a header, the header comprising a plurality of Network Bytes to transmit network operator information and other private information.

According to various embodiments of the invention, the header further comprises a PSTART indicator to identify a position at which payload data begins.

According to various embodiments of the invention, the header further comprises an LBYTE portion to indicate a length of the frame.

According to various embodiments of the invention, the header further comprises a PBYTE portion to indicate an amount of padding added to the first codeword.

According to various embodiments of the invention, the header further comprises a PBYTE portion to indicate an amount of padding added to the frame.

According to various embodiments of the invention, the number of codewords in a frame is determined by the modulation of the frame.

According to various embodiments of the invention, a method for transmitting a digital signal, may involve: transmitting a digital signal; and receiving the digital signal; wherein the digital signal comprises a plurality of frames, each frame comprising at least one codeword, wherein said system supports at least two different modulations, and wherein each of the plurality of frames has the same number of symbols.

According to various embodiments of the invention, the Unique Words are received at a fixed rate.

According to various embodiments of the invention, the fixed rate is a predetermined rate.

According to various embodiments of the invention, a digital communications system may have: a receiver to receive the digital signal; wherein the digital signal comprises a plurality of frames, each frame comprising at least one codeword, wherein said system supports at least two different modulations, and herein each of the plurality of frames is transmitted in a same amount of time.

According to various embodiments of the invention, a digital communications system may have: a transmitter to transmit a digital signal; wherein the digital signal comprises a plurality of frames, each frame comprising at least one codeword, wherein said system supports at least two different modulations, and herein each of the plurality of frames is transmitted in a same amount of time.

DETAILED DESCRIPTION OF THE INVENTION

According to various embodiments of the invention, a method of formatting a satellite transmission signal provides an efficient signaling structure for satellite receivers to achieve fast acquisition, reliable signal tracking and message decoding with minimal transmission overhead.

It should be understood that various communication systems requiring frame formatting may alternatively employ the technique shown herein. For example, a terrestrial digital broadcast system could adopt the present invention.

According to various embodiments of the invention, the frame structure serves multiple purposes such as providing the frame time mark for receivers to decode messages, providing a special signal allowing a receiver to acquire the signal when accessing the network and to reduce the time and/or frequency errors such that reliable demodulation and decoding are possible, and providing header information for demodulation and decoding control and user packet striping. In some cases, the special signal may also be used for channel estimation and/or other digital signal processing (DSP) purposes.

Figure 1:
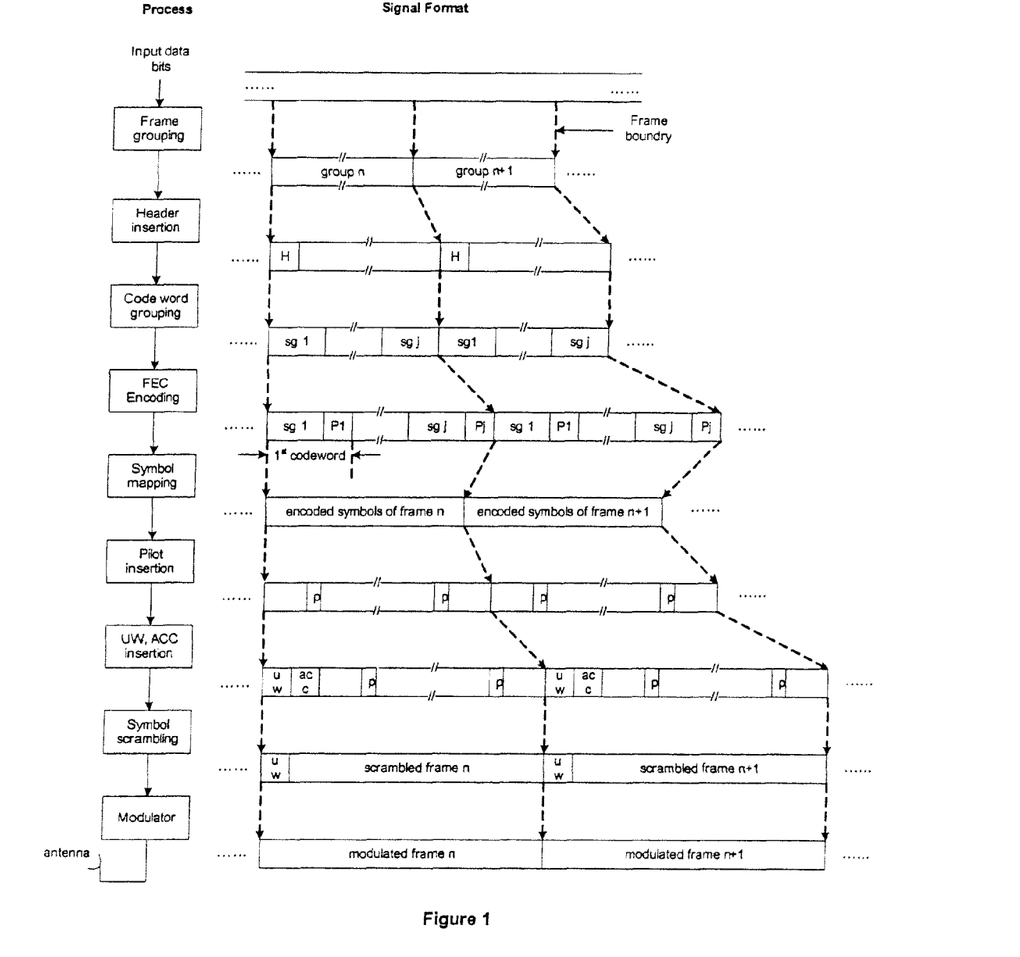
FIG. 1 illustrates an exemplary block diagram of a satellite transmitter showing a framing process transforming original user data into modulated frames, according to an embodiment of the invention.

Illustrated in FIG. 1 is a block diagram of a satellite transmitter showing a framing process to transform original user data into modulated frames, according to various embodiments of the invention. The input data bits to be transmitted are first divided into subsequent groups, e.g. group n and group n+1 as shown in the figure. Each group contains a number of information bits required for the corresponding frame. Each of the information groups is then prefixed by a header (H) by the header insertion module. The header, along with each group, is further divided into j (an integer) subgroups (sg) by the codeword grouping module, with each sub-group carrying an equal number of bits. For illustration purpose, j denotes the number of sub-groups in each group. For each sub-group, the FEC encoder computes the error checking and error correction parity bits (P) of a fixed length based on the sub-group's data pattern and attaches the parity bits to the end of the associated sub-group to form a code word.

According to various embodiments of the invention, the symbol mapping module maps the bit stream of each codeword into modulation symbols according to the corresponding modulation type in the codeword. Following the symbol mapping, all frames are of an equal length, regardless of modulation used.

According to various embodiments of the invention, the pilot insertion module may insert a number of pilot waves (p) evenly into the encoded frames as shown in FIG. 1. Also, the UW and ACC insertion module will add a UW followed by an ACC at the beginning of each frame. The symbol scrambler scrambles the symbols of each frame but the UW using a fixed scrambling pattern. Finally all the symbols may be modulated to a radio frequency for transmission through an antenna.

According to various embodiments of the invention, using a broadcast mode, different satellite transponders may use different modulation and different FEC codes. However, for each transponder with an assigned modulation and FEC, the number of information bits (such as in group n and n+1) is constant for all frames. According to various embodiments of the invention, where a receiver is required to tune to different satellite transponders, the receiver is designed to process signal with different modulation and FEC. The variation of signal modulation in such a system would create a difficulty for physical layer implementation of the satellite receiver if the frame format is not properly designed.

Maintaining the same number of symbols in each frame for different modulations yields multiple benefits. Even though using UW for synchronization is a common approach for many digital communication systems, the UW, according to various embodiments of the invention, using this particular frame structure will appear at a constant rate regardless of the modulation used. Accordingly, UW waveforms are very easy for receiver to acquire and lock on, thus greatly simplifying receiver implementation. Additionally, synchronization performance can be easily achieved and maintained, and is not dependent on the modulation, again due to the evenly distributed UW waveforms. Furthermore, according to various embodiments of the invention, this design leads to the presence of multiple codewords in each frame, and thereby offers a higher transmission efficiency for a relatively shorter but powerful FEC codeword due to a smaller overhead, especially for higher dimensions of modulation where more codewords are accommodated in a frame.

Figure 2:
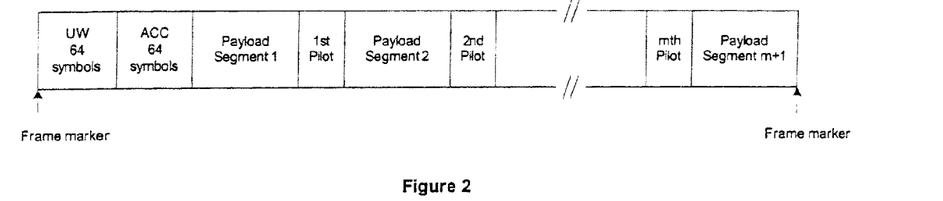
FIG. 2 displays an exemplary formed frame structure, according to an embodiment of the invention.

FIG. 2 depicts an exemplary frame format of a transmitted frame, according to an embodiment of the invention. The frame starts with an 64-symbol UW, followed by 64-symbol ACC, and m+1 segments of encoded data (or payload data) separated by m evenly distributed pilots. The UW is designed to yield a good detection property to provide a fast acquisition. According to various embodiments of the invention, the UW is a 64-symbol QPSK modulated waveform with I and Q defined as:

UW$_I$=0x40F0B6EC088E3A21,
UW$_Q$=0xEB498CA3B538F49D.

According to various embodiments of the invention, the ACC may employ multi-tone modulation to convey multiple information bits that contain the information on the modulation type and the FEC code rate, which is used for proper demodulation and decoding. An exemplary ACCs for carrying 8-bit information is derived from an 8-tone generator matrix defined by:

$$G = [G_1 \; G_2] = \begin{bmatrix} g_0 \\ g_1 \\ \ldots \\ g_7 \end{bmatrix},$$

where $$G_1 = \begin{bmatrix} 0101010101010101010101010101010101010101010101010101010101010101 \\ 0011001100110011001100110011001100110011001100110011001100110011 \\ 0000111100001111000011110000111100001111000011110000111100001111 \\ 0000000011111111000000001111111100000000111111110000000011111111 \\ 0000000000000000111111111111111100000000000000001111111111111111 \\ 0000000000000000000000000000000011111111111111111111111111111111 \\ 0000000000000000000000000000000000000000000000000000000000000000 \\ 1111111111111111111111111111111111111111111111111111111111111111 \end{bmatrix}$$

$$G_2 = \begin{bmatrix} 0101010101010101010101010101010101010101010101010101010101010101 \\ 0011001100110011001100110011001100110011001100110011001100110011 \\ 0000111100001111000011110000111100001111000011110000111100001111 \\ 0000000011111111000000001111111100000000111111110000000011111111 \\ 0000000000000000111111111111111100000000000000001111111111111111 \\ 0000000000000000000000000000000011111111111111111111111111111111 \\ 0000000000000000000000000000000000000000000000001111111111111111 \\ 1111111111111111111111111111111111111111111111111111111111111111 \\ 1111111111111111111111111111111111111111111111111111111111111111 \end{bmatrix}$$

It is clear that each row ($g_0$ through $g_7$) of matrix G is a tone which is orthogonal to other rows. With the 8 information bits $b_0 b_1 b_2 b_3 b_4 b_5 b_6 b_7$, the multi-tone modulation results in $$B = b_0 g_0 + b_1 g_1 + \ldots + b_7 g_7$$

The sums represent xor operation. The 128-bit vector B may alternatively be assigned to the I and Q of the QPSK modulator to yield the final 64-symbol ACC waveform.

According to various embodiments of the invention, the number of payload segments (m+1) between two consecutive pilots segments in each frame is determined by the frame length in symbols and the distance between the two pilot segments, which is designed to provide reliable synchronization with minimal overhead. According to various embodiments of the invention, maintaining pilots pattern and location constant for different modulation and FEC decoding is extremely ideal. According to various embodiments of the invention, the desired information length between two consecutive pilots is 1280 symbols, regardless of modulation used. The size of each pilot wave may also be adjustable. Frames for an extreme case may contain no pilot so as to achieve the smallest overhead. In this case, modulation dimension is usually low and channel is usually fair.

Figure 3:
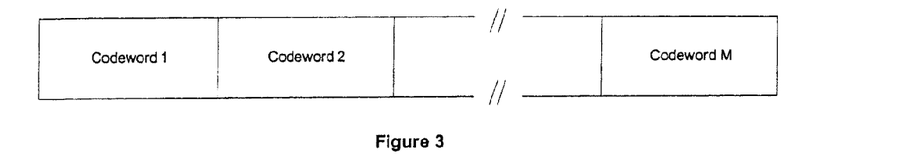
FIG. 3 depicts an exemplary encoded data block comprising a number of code words ready to be formatted to the structure of FIG. 2, according to an embodiment of the invention.

As illustrated in FIG. 3, according to an embodiment of the invention, an integer is assigned to the number of LDPC codewords in each frame as the payload data. The benefit is a simple decoder control logic where the decoder does not need to decode payload across the frame boundary.

Furthermore, according to the exemplary embodiment of FIG. 3, the codeword itself is designed to have a constant length in bits to simplify the decoding implementation. Accordingly, the number of code words in a frame depends on the modulation dimension. A higher modulation dimension leads to more codewords in a frame. Following description demonstrates the relationship of a modulation dimension to the number of codewords. If N is the number of bits per codeword (constant for all codewords), D is the modulation dimension for each codeword, the number of symbols M in each code word is M=N/D.

Thus, as shown in this example, to have an integer number of symbols for each codeword, N must be divisible by all possible modulation dimensions D. Specifically, in the embodiment of this invention shown in FIG. 3, the design has N=15360. The number of symbols in the codeword corresponding to modulation dimension 2, 3, 4 and 5 are 7680, 5120, 3840 and 3072, respectively. According to various embodiments of the invention, each frame is assigned a number of payload symbols 30720. Therefore, each frame will carry 4, 6, 8 and 10 code words corresponding to modulation dimension 2, 3, 4 and 5, respectively. Even for non-constant modulation (such as in ACM mode), 10 other combinations of codeword modulation can be provided, sufficient for an ACM application. Table 1 lists possible combinations of codeword modulation. There are 14 possible codeword assignments. For example, combination 5 indicates that a frame can take 3 codewords with modulation dimension 2 and 2 code words with dimension 4. The order in which the codewords are arranged is arbitrary and flexible enough for a network operator.

Additionally, Table 1 provides a very efficient way to utilize the frame resources. In an example where a user's data may not be continuous, it may not be necessary to follow the format defined in the table. For this reason, some unused symbols may be present towards the end of the frame. Those symbols may be defined as dummy symbols and may be modulated by all-zeros bit pattern. Continuing the above example, the number of dummy symbols is given by $$N_{dummy}=30720-7680N_1-5120N_2-5120N_3-3840N_3-3072N_4$$

where $N_1$, $N_2$, $N_3$ and $N_4$ are the number of codewords in the frame for modulation dimension 2, 3, 4 and 5, respectively. Note that $N_{dummy}=0$ (100% efficiency) if $N_1$, $N_2$, $N_3$ and $N_4$ are one of the listed pattern in Table 1.

TABLE 1

Assignment of code words to each modulation dimension

| | | | | | | Combination index | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Modulation dimension | 2 | 4 | 6 | 8 | 10 | 3 | 2 | 2 | 2 | 1 | 1 | 1 | | |
| | 3 | | | | | | 3 | | | | 3 | | 3 | 3 |
| | 4 | | | | | 2 | | 4 | | 6 | 2 | 2 | 4 | | 4 |
| | 5 | | | | | | | | 5 | | | 5 | | 5 | 5 |

Figure 4:
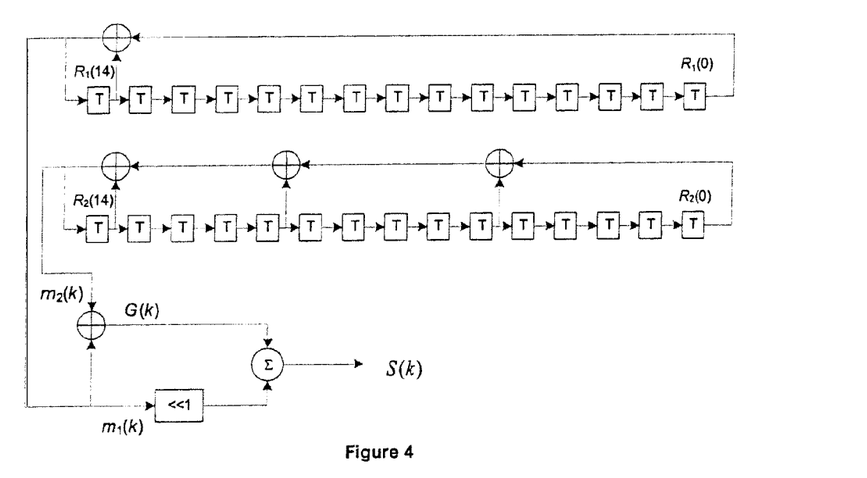
FIG. 4 depicts an exemplary scrambling sequence generator, according to an embodiment of the invention.

FIG. 4 is an example of frame scrambler which can support frame length up to 30,000 symbols, according to various embodiments of the invention. In this example, the two 15-bit shift registers are used to generate two maximum length pseudo random sequences which are the preferred pair for a Gold sequence set. One Gold sequence is the sum of the two m-sequences. Combining the Gold sequence with the top sequence as shown, the final scrambling sequence with elements in {0, 1, 2, 3} is achieved. The sequence is then used to rotate the input (I, Q) symbols as defined in Table 2. The same scrambling pattern may be used for each new frame.

TABLE 2

Symbol scrambling logic

| S(k) | $I_{scrambled}(k)$ | $Q_{scrambled}(k)$ |
|---|---|---|
| 0 | I(k) | Q(k) |
| 1 | −Q(k) | I(k) |
| 2 | −I(k) | −Q(k) |
| 3 | Q(k) | −I(k) |

Figure 5:
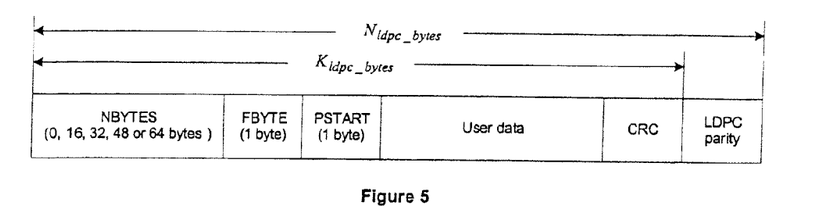
FIG. 5 depicts an exemplary format of the first code word in a frame, according to an embodiment of the invention.
Figure 6:
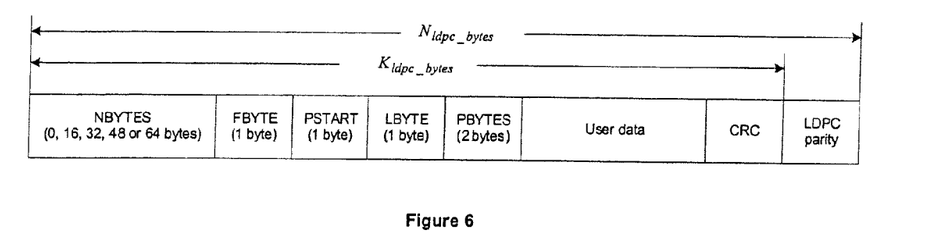
FIG. 6 depicts a second exemplary format of the first code word in a frame, according to an embodiment of the invention.
Figure 7:
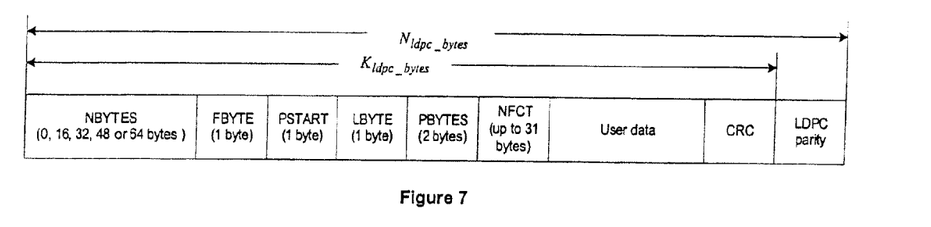
FIG. 7 depicts a third exemplary format of the first code word in a frame, according to an embodiment of the invention.

According to various embodiments of the invention, a header is only embedded in the first codeword of each frame as shown in FIG. 1. The codeword length is usually much larger than the header. According to various embodiments of the invention, the sharing of one header embedded in the first codeword by all the codewords of a frame results in a higher efficiency and simpler decoder implementation. FIG. 5 to FIG. 7 display three exemplary formats for the first codeword, wherein the format being used is application specific. For example, the format in FIG. 7 is used in an ACM application. In these figures, bytes (=8 bits) are used to measure the length of each functional field of the codeword for convenience.

All three exemplary formats share the common fields as follows:

NBYTES: these multiples of 16 bytes may be used to convey important information by network operator and other private information. One benefit to convey private information in a physical layer is that users can quickly decode the information without waiting for higher layer message decoding. Another benefit is that the private data information does not need to interrupt the continuous data stream such as a transport stream at higher layer. The receiver at the physical layer can directly output data stream to the higher layer. Thus the overall transmission and receiving for both the private data and continuous data are very simple.

FBYTES: the 8 bits of FBYTE may be used to carry information such as the operation mode, stream type, user ID, etc.

PSTART: this byte may define the starting position of the first complete user packet relative to the beginning of the user data in the first codeword. PSTART is used because codewords and user packets are generally not aligned.

Other than the above common fields, LBYTE, as shown in FIG. 6 and FIG. 7 may be used to define a user packet length. This format may be used for applications in which receivers do not know the user packet length in advance. The padding bytes (PBYTES) in FIG. 6 and FIG. 7 may be used to define the number of bytes padded with zeros in the frame if the user data does not completely fill the frame. An exemplary exception of PBYTES may be for an ACM mode, where PBYTES might only represent the number of zeros padded into the first codeword.

According to various embodiments of the invention, a Next Frame Composition Table (NFCT) may be designed for an ACM application in which each codeword may be independent from others in a frame in terms of modulation type and/or FEC code rate. The NFCT may be used to define the composition of the frame following the current frame. The NFCT following a PBYTES takes the syntax as shown in Table 3. The corresponding bit and byte positions are illustrated in FIG. 7.

TABLE 3

NFCT definition.

| | No. of bits | |
|---|---|---|
| syntax | reserved | information |
| Next_Frame_Composition_Table( ){ | | |
| Codeword_count_in_next_frame | | 4 |
| | 4 | |
| For(i=0;i<=codeword_count_in_next_frame;i++){ | | |
|    Status | | 1 |
|    Modulation | | 2 |
|    Code_rate | | 4 |
|    Padding_in_bytes | | 16 |
| | 1 | |
| } | | |
| } | | |

Figure 8:
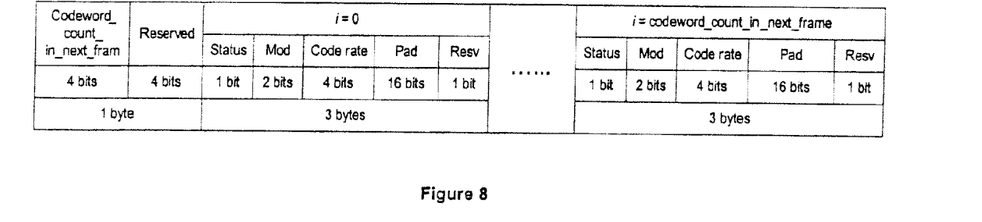
FIG. 8 depicts an exemplary illustration of the Next Frame Composition Table (NFCT) in the first code word design for ACM application, according to an embodiment of the invention.

Terms in FIG. 8 may be defined in various exemplary embodiments of the invention as follows:

Codeword_count_in_next_frame: this may be a 4-bit field indicating one less than the number of LDPC codewords in next frame. The codeword index i may start from 0 to code Codeword_count_in_next_frame≥0. Accordingly, in this exemplary embodiment, at least one codeword in a frame is always transmitted, i.e. the first codeword of each frame is guaranteed for transmission.

Status: 1 bit indicating the code word status. 1=valid payload, 0=no payload data or empty code word (zeros padded). When the status bit is a 0, it is not necessary to demodulate and/or decode the codeword.

Modulation: 2 bits to indicate the modulation scheme.

Code_rate: 4 bits to indicate the code rate.

Padding_in_bytes: zero padding in a particular codeword in bytes, wherein the number of bytes to be padded with zeros is given by:

$$N_{zero\_pad} = \sum_{i=0}^{10} b_i \cdot 2^i,$$

where $b_{15}$ to are reserved and $b_0$ represents the LSB of the 16 bits.

It is understood that some of the fields may have different bit widths in different applications.

Figure 9:
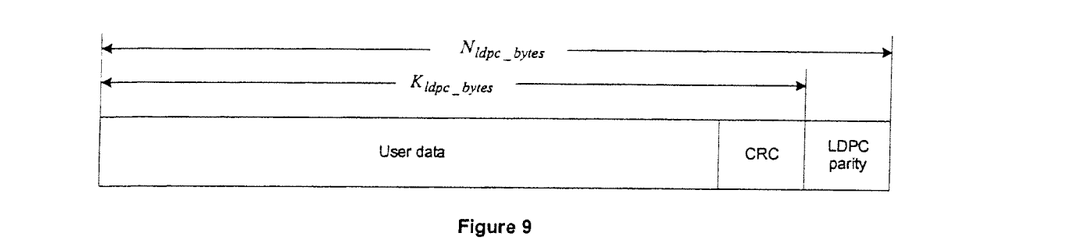
FIG. 9 depicts an exemplary format of all code words in an exemplary frame excluding the first code word, according to an embodiment of the invention.

FIG. 9 displays an exemplary codeword format for codewords other than the first one.

According to various embodiments of the invention, codewords may be completed by appending FEC parity bytes having a CRC error checking field and LDPC error correction field.

The foregoing descriptions of various embodiments of the invention have been presented for the purposes of illustration and description. The exemplary embodiments are not intended to be exhaustive or to limit the invention to the precise forms disclosed. Many modifications and variations are possible in light of the above teaching. It is intended that the scope of the invention be limited not by this detailed description, but rather by the claims appended hereto.

We claim:

1. A digital satellite transmission system to transmit a periodic unique word, comprising:
   a transmitter to transmit the periodic unique word, the periodic unique word comprising a 64-symbol QPSK modulated waveform with baseband I and Q bits defined as
   $UW_I$=0x40F0B6EC088E3A21,
   $UW_Q$=0xEB498CA3B538F49D.

2. A digital storage media to store a unique word, comprising:
   a memory to store the unique word, the unique word comprising baseband I and Q bits defined as
   $UW_I$=0x40F0B6EC088E3A21,
   $UW_Q$=0xEB498CA3B538F49D.

3. A frame format of a digital satellite transmission, comprising:
   a plurality of frames, each frame having a fixed number of modulated symbols, regardless of a modulation type of the system, and each frame beginning with a unique word, wherein a spacing, in number of symbols, between any two consecutive unique words is identical, regardless of modulation type in the system, and a length of the pilot segments is adjustable.

4. A frame format of a digital satellite transmission, comprising:
   a plurality of frames, each frame having a fixed number of modulated symbols, regardless of a modulation type of the system, and each frame beginning with a unique word, wherein a spacing, in number of symbols, between any two consecutive unique words is identical, regardless of modulation type in the system, and the number of symbols per frame, excluding the unique word, an auxiliary control code and the pilot segments, perfectly accommodates a different number of codewords for each different modulation while maintaining a fixed frame length.

5. A frame format of a digital satellite transmission, comprising:
   a plurality of frames, each frame having a fixed number of modulated symbols, regardless of a modulation type of the system, and each frame beginning with a unique word, wherein a spacing, in number of symbols, between any two consecutive unique words is identical, regardless of modulation type in the system, and network operation information and/or other private information may be transmitted through a plurality of system information in a header of each frame.

6. A digital satellite receiver system to receive a signal with a periodic unique word designed to combat various impairments in satellite communication systems, comprising:
   a receiver to receive a signal, wherein the receiver achieves synchronization to the signal based on the periodic unique word that undergoes a special pre-coding before a complex correlator and is QPSK modulated with I and Q defined as
   $UW_I$=0x40F0B6EC088E3A21
   $UW_Q$=0XEB498CA3B538F49D.

7. A digital satellite receiver system to process a received signal, comprising:
   a receiver to receive the signal; and a processor to process the signal, wherein the signal comprises a frame format that contains a fixed number of modulated symbols per frame and a unique word at a beginning of each frame, and said receiver can decode all the codewords in a frame based on only a header embedded in the first codeword of the frame, regardless of number of codewords in the frame; the unique word is QPSK modulated with I and Q defined as
   $UW_I$=0x40F0B6EC088E3A21
   $UW_Q$=0XEB498CA3B538F49D.

8. The method of claim 7, wherein said receiver can decode a plurality of FEC codewords in a single frame, regardless of modulation employed.

9. The method of claim 7, wherein said receiver can process an inserted pilot segment of a given length if in a pilot operation mode.

10. The method of claim 9 wherein said receiver can decode network operation information and/or other private information located immediately following a header field in each frame for any modulation.

11. A digital communications system, comprising: a transmitter to transmit a digital signal; and wherein the digital signal comprises a plurality of frames, each frame comprising at least one codeword, wherein said system supports at least two different modulations, each of the plurality of frames has the same number of symbols, and a first codeword in each frame comprises a header, the header comprising a plurality of system information to transmit network operator information.

* * * * *